J. & R. REID.

GRAIN CRUSHER.

No. 9,992. Reissued Dec. 27, 1881.

Attests

L. J. Motor

Inventors

Joseph Reid and

Robert Reid

By their atty.

N. PETERS, Photo-Lithographer, Washington, D. C.

UNITED STATES PATENT OFFICE.

JOSEPH REID, OF WYANDOTTE, KANSAS, AND ROBERT REID, OF PHILADELPHIA, PENNSYLVANIA.

GRAIN-CRUSHER.

SPECIFICATION forming part of Reissued Letters Patent No. 9,992, dated December 27, 1881.

Original No. 190,250, dated May 1, 1877. Application for reissue filed June 9, 1881.

*To all whom it may concern:*

Be it known that we, JOSEPH REID, formerly of Philadelphia, Pennsylvania, but now of Wyandotte, county of Wyandotte, and State of Kansas, and ROBERT REID, of Philadelphia, in the county of Philadelphia and State of Pennsylvania, have invented a new and Improved Grain-Crusher, of which the following is a specification.

Our invention relates to grain-crushers particularly adapted to crush corn; and it consists in two crushing rolls, one above the other, the upper one being set slightly to one side of the vertical line through the lower one, to give surface-speed to the grain fed upon said lower roll and before it passes between the rolls, the upper of said rolls being provided with holes upon its crushing-surface, in combination with means to regulate the pressure with which they crush and a spring or springs to press said rolls together; further, in providing the crushing-rolls with means to scrape the crushed corn from the metallic surface and cause it to be passed down a chute; and, finally, in many details of construction, all of which are now fully set forth in the following specification, and shown in the accompanying drawings, which form part thereof.

Figure 1:
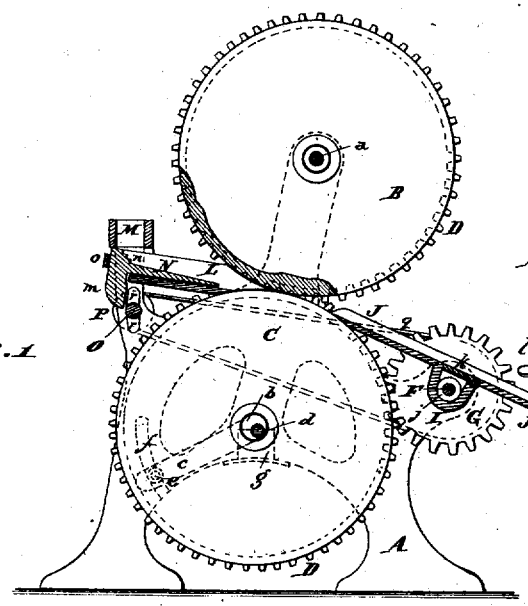
Figure 2:
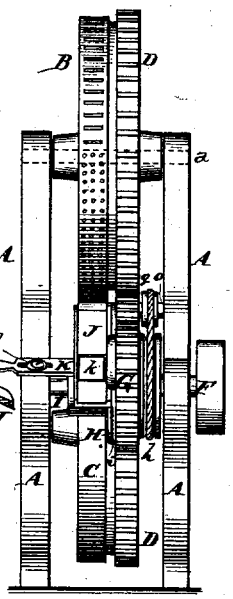
Figure 3:
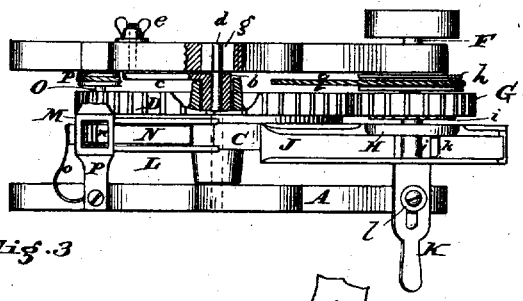
Figure 4:
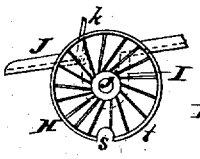
Figure 5:
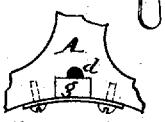

In the drawings, Figure 1 is a side elevation having a portion of the frame removed. Fig. 2 is a front elevation. Fig. 3 is a plan view having portions broken away to show the arrangement of the parts more clearly. Fig. 4 is a detail view of a part of the pulverizing apparatus. Fig. 5 is a detail view of a spring that supports the shaft of one of the crushing-rolls.

Similar letters of reference indicate corresponding parts.

In the drawings, A is the frame of the machine, and B C are the crushing-rolls, arranged above each other in an oblique line to the horizontal, and supported by suitable journals in the said frame, and geared together by the spur-wheels D D, attached to the rolls, so that the periphery or crushing-surfaces of the two rolls move together at an equal speed, thus crushing the grain that passes between them with a small expenditure of power. The surface of the upper roll is provided with transverse grooves, or with shallow holes or indentations. The hub of the roll B is elongated, and revolves on a fixed shaft, *a*, and the hub of the roll C is elongated, and revolves on an adjustable eccentric, *b*, that is provided with the lever *c*, and is capable of turning on a shaft, *d*, so as to adjust the distance between the faces of the crushing-rolls. The lever *c* is provided with a binding-screw, *e*, that passes through an arc-shaped slot, *f*, in the leg of the frame A, and is capable of binding the lever *c*, so as to retain the eccentric *b* in any desired position. The shaft *d* is mounted on springs *g*, Fig. 5, of rubber, metal, or other suitable material, to permit the yielding of the roll C in case a piece of hard or unyielding substance passes between the rolls.

F is the driving shaft of the machine, upon which is placed the driving-pinion G, which meshes into the wheel C, and also the grooved pulley *h*, which drives the vibrator-shaft. The face *i* of the pinion G is grooved and serrated, something like the face of a millstone.

H is a grooved and serrated plate, provided with a rim, *t*, Fig. 4, that encircles the part *i*, and having a notch, *s*, in its lower edge for the escape of the pulverized grain. A boss, I, is formed on the said plate, to which the chute J and the slotted bar K are attached. The said boss is fitted to the shaft F and chambered out, forming a passage, *j*, from the chute J to the serrated surface of the plate H. This passage is closed by a door or valve, *k*, hinged in the bed of the chute at the lower side of the opening of the passage. The upper end of the chute J rests upon the roll C near the point of contact between the upper and lower rolls, and is chamfered or brought to an edge to facilitate the removal of the crushed grain from the roll. The slotted bar K extends over the side of the frame A, to which it is clamped by a screw, *l*, that passes through its slot into the said frame.

L is a chute connected with the grain-hopper M and provided with a double bottom, N, the upper rear portion of which is provided with a tappet, *m*, which projects downward, and a notched lug, *n*, that projects upward and forms a part of the back of the mouth of the hopper M. A spring, *o*, is attached to the cross-bar P, that supports the hopper and rests against the end of the movable part of the chute.

O is a shaft at the rear of the machine, to which the cams *r r* are attached, which are capable of engaging the tappet *m*.

P is a grooved pulley, keyed on the shaft O and driven by a belt, *q*, that runs from the pulley *h* on the main shaft. Grain to be crushed is delivered to the hopper M, and the machine being in motion it is caused by the vibratory motion of the part N to flow rapidly down the chute L to the roll C, upon which it is carried, acquiring the velocity of the said roll, and with this velocity it enters the crushing-surface between the two rolls B C, by which it is crushed and delivered to the chute J, through which it passes to a suitable receptacle.

If it is required to pulverize the grain after it is crushed by the rolls, the door *k* is thrown up, when the grain passes through the opening *j* into the space between the grinding-surface *i*. carried by the pinion G, and the stationary plate H, where it is reduced to meal or coarse flour and delivered through the opening *s*.

The advantages claimed for our machine are that the grain may be rapidly crushed with little expenditure of power, and it may be reduced to meal or coarse flour at one operation, if desired.

We do not confine ourselves to the exact construction herein set forth, as it is obvious that various changes may be made without departing from our invention. The spring-bearing may be applied to the upper roll instead of the lower one.

The machine operates as follows: The corn fed to the hopper is propelled down to the lower roll, and is carried upon its periphery, and after being carried some distance, acquiring the velocity of the roll, is fed between the crushing-rolls and crushed, passing out, and after being scraped off is fed down the chute for use in that crushed condition, or to the pulverizing apparatus.

Having thus described our invention, we claim as new and desire to secure by Letters Patent—

1. In a grain crusher, two crushing-rolls, the upper of which is located slightly to one side of the vertical line through the lower roll, and is provided with holes upon its crushing-surface, in combination with a feeding device to feed the grain in a small stream upon the lower roll a short distance before it reaches the upper roll, substantially as and for the purpose specified.

2. In a grain-crusher, two crushing-rolls, the upper of which is located slightly to one side of the vertical line through the center of the lower roll, and is provided with holes upon its crushing-surface, in combination with a feeding device to feed the grain in a small stream upon the surface of the lower roll a short distance before it reaches the upper roll, and springs to press the two rolls into contact with each other, substantially as and for the purpose specified.

3. In a grain-crusher, two crushing-rolls, the upper of which is located slightly to one side of the vertical line through the center of the lower roll, and is provided with holes upon its crushing-surface, in combination with a feeding device to feed the grain in a small stream upon the surface of the lower roll a short distance before it reaches the upper roll, springs to press the rolls into contact with each other, and a scraper to remove the crushed grain from the lower roll, substantially as and for the purpose specified.

4. A crushing-roll for grain-crushers having its crushing-surface provided with numerous small holes, in combination with another crushing-roll having a perfectly smooth surface, said rolls working together, and a spring to press the rolls into close contact, but yet allow them to be separated for the passage of any hard uncrushable substance, substantially as and for the purpose specified.

In testimony of which invention we hereunto set our hands.

JOSEPH REID.
ROBERT REID.

Witnesses as to signature of Joseph Reid:
J. N. MOYER,
A. N. MOYER.
Witnesses as to signature of Robert Reid:
R. M. HUNTER,
L. J. MATOS.